Feb. 28, 1956 G. THIRUP 2,736,865
ADJUSTABLE PHASE-SHIFTING DEVICE FOR
HIGH-FREQUENCY ALTERNATING VOLTAGES
Filed April 18, 1952
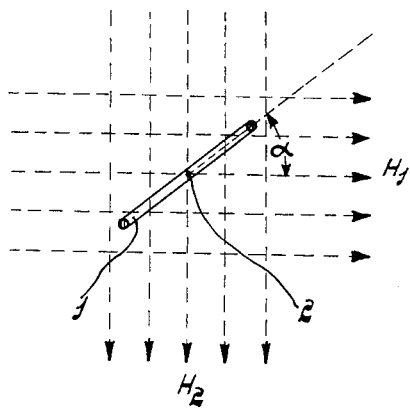
Fig. 1
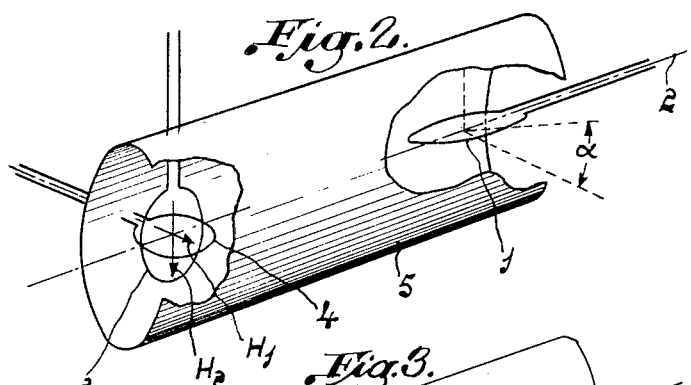
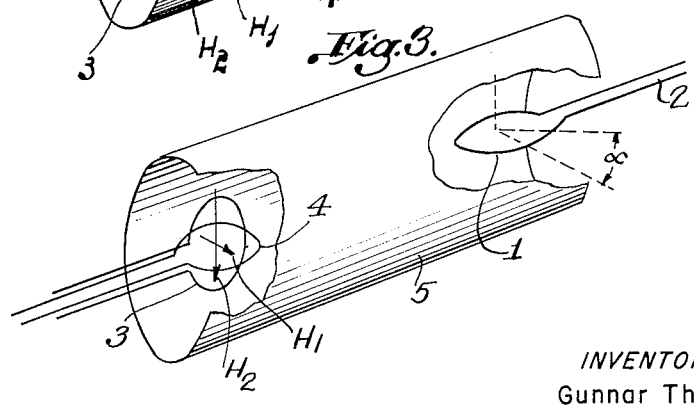
INVENTOR
Gunnar Thirup
BY
AGENT

United States Patent Office 2,736,865
Patented Feb. 28, 1956

2,736,865

ADJUSTABLE PHASE-SHIFTING DEVICE FOR HIGH-FREQUENCY ALTERNATING VOLTAGES

Gunnar Thirup, Eindhoven, Netherlands, assignor to Hartford National Bank and Trust Company, Hartford, Conn., as trustee Application April 18, 1952, Serial No. 283,150

Claims priority, application Netherlands May 9, 1951

6 Claims. (Cl. 333—31)

This invention relates to adjustable phase-shifting devices for high-frequency alternating voltages. Such phase-shifting devices are used to derive from an alternating voltage another alternating voltage having a phase which is adjustable with respect to the first-mentioned alternating voltage. This problem occurs inter alia in measuring equipments.

In phase-shifting devices of known type, the output voltage is derived from a loop, which is coupled with a magnetic rotational field derived from the input voltage. The loop is rotatably arranged about the axis of the rotational field. The phase angle between the output voltage and the input voltage may be varied by turning the loop about the above-mentioned axis. To a first approximation, the said phase angle is equal to the angle made by the loop and a fixed line at right angles to its axis of rotation, so that the device does not need calibration.

As a rule, the rotational field is obtained by producing two alternating magnetic fields in relatively perpendicular directions, which fields exhibit a phase angle of 90°. This may be effected, for example, by supplying two voltages shifted in phase by 90° to two coils or two pairs of coils, of which the axes intersect at right angles. A disadvantage of such and similar devices is that the phase angle occurring is not exactly equal to the angle enclosed by the loop and a fixed line, so that a calibration curve is required to ensure accurate results. This will be explained more fully hereinafter.

The object of the invention is to provide an improved adjustable phase-shifting device.

According to the invention an adjustable phase-shifting device for alternating voltages, in which the output voltage is derived from a loop which is coupled with a magnetic rotational field and which is rotatable about the axis of the rotational field, is characterised in that the coupling between the loop and the rotational field is constituted by a cylindrical wave guide, of which the axis coincides with that of the rotational field and the diameter of which is smaller than 0.578 times the wavelength corresponding to the frequency of the rotational field.

The invention will now be described with reference to the accompanying diagrammatic drawing, given by way of example, in which Fig. 1 shows a known phase-shifting device;

Fig. 2 shows one embodiment of a phase-shifting device according to the invention; and Fig. 3 illustrates a modification of the embodiment shown in Fig. 2.

In the known phase-shifting device shown in Fig. 1, two relatively perpendicular, alternating magnetic fields $H_1$ and $H_2$ are produced, each having an amplitude $H$, but with a phase-shift of 90°. Thus, $$H_1 = -H \sin \omega t \quad (1)$$
and
$$H_2 = H \cos \omega t \quad (2)$$

A loop-like coil 1 is arranged in this field so as to be rotatable about a shaft 2, which is at right angles to the plane of the drawing. If the angle $\alpha$ is 90°, the voltage induced in the coil 1 by the field $H_1$ is maximum. Assuming that said voltage is equal to $V \cos \omega t$.

In the position shown, the induced voltage then is $V \cos \omega t \sin \alpha$.

The field $H_2$ will induce in the coil a voltage having a value $V \sin \omega t \cos \alpha$.

Thus, for the total induced voltage $V_i$ we may substitute $$V_i = V \cos \omega t \sin \alpha + V \sin \omega t \cos \alpha = V \sin (\omega t + \alpha) \quad (3)$$

Consequently, the amplitude of the voltage induced in the coil 1 is independent of the angle $\alpha$ and the phase-angle of said voltage is equal to the angle $\alpha$. In this case, the device would not require to be calibrated, since a phase shift of, for example, 10° of the voltage $V_i$ may be obtained by turning the coil through 10° about the shaft 2.

It appears that the said two properties of this device are provided only if the magnetic fields $H_1$ and $H_2$ are homogeneous. This cannot be realized in practice. Consequently, in the position shown instead of the voltages $V \cos \omega t \sin \alpha$ and $V \sin \omega t (\alpha + 90°) = V \sin \omega t \cos \alpha$, being induced, the voltages $f(\alpha) V \cos \omega t \sin \alpha$ and $$f(\alpha + 90°) V \sin \omega t \sin (\alpha + 90°)$$
$$= f(\alpha + 90°) V \sin \omega t \cos \alpha,$$

will be induced in the coil, where $f(\alpha)$ is a function of $\alpha$ which is equal to 1 only if $\alpha$ is 90° or 270°, whilst for other values of $\alpha$ said function will have a value which differs from 1 more or less, the difference being dependent upon the nonhomogeneity of the fields $H_1$ and $H_2$. The latter are assumed to be identical, apart from their different spatial positions. For $V_i$ we now find:

$$V_i = f(\alpha) V \cos \omega t \sin \alpha + f(\alpha + 90°) V \sin \omega t \cos \alpha =$$
$$\sqrt{[f(\alpha)]^2 \sin^2 \alpha + [f(\alpha + 90°)]^2 \cos^2 \alpha} . V \sin (\omega t + \varphi)$$
$$(4)$$

wherein $$\text{Tan. } \varphi = -\frac{f(\alpha)}{f(\alpha + 90°)} \tan. \alpha \quad (5)$$

From (4) it follows that the amplitude of $V_i$ is, as a rule, not independent of $\alpha$, whereas from (4) and (5) it follows that the phase angle $\varphi$ of the induced voltage will, as a rule, be different from the angle $\alpha$ between the plane of the coil 1 and a fixed line. The second point is the more important one, since the consequence thereof is that the device is no longer absolute and needs calibration.

Fig. 2 shows a phase-shifting device according to the invention in which identical elements are indicated by the same reference numerals as in Fig. 1. The magnetic rotational field, as before, is obtained by relatively perpendicular, alternating magnetic fields $H_1$ and $H_2$ which are relatively shifted with time in phase by 90°. Said fields are produced by causing coils 3 and 4 to be traversed by currents which are phase-shifted by 90°. The loop 1 is coupled with the resultant rotational field with the use of a cylindrical wave-guide. 5. The diameter thereof is smaller than 0.578 times the wavelength corresponding to the frequency of the rotational field $H_1$, $H_2$. For the sake of clearness, the wall of the wave-guide is shown as partly broken away. The axis of the wave guide 5 coincides with the axis of rotation 2 of the coil 1.

Owing to the above-mentioned choice of the diameter of the wave guide, travelling waves cannot occur therein, but only an electro-magnetic field greatly decreasing exponentially in amplitude in the longitudinal direction of the waveguide.

It appears in this case that the damping is dependent upon the nature of the oscillation. The rotational field $H_1$, $H_2$ may be resolved into a pure rotational field corresponding to the case in which $H_1$ and $H_2$ would be homogeneous, and into a series of magnetic fields of an increasingly complicated character, which are attributable to the nonhomogeneities. The former part leads to a circularly polarized $H_{11}$-field in the wave-guide and the second part to a series of fields of more complicated character, generally represented by $H_{mn}$. It appears that the damping for the fields of the latter group is much greater than that for the $H_{11}$-fields. Thus, in practice, only the circularly polarized $H_{11}$-field exists even at a small distance from the coils 3 and 4. The magnetic field which in this case occurs is a pure rotational field, in which the loop 1 has introduced into it an alternating voltage of which the amplitude is not dependent upon $\alpha$ and of which the phase angle is equal to $\alpha$, similarly as in the equation (3). Thus the phase-shifting device does not need calibration.

The rotational field may be produced in the wave-guide 5 in any known manner.

The best suppression of undesirable wave forms is obtained if the diameter of the wave-guide is smaller than 0.1 of the wavelength corresponding to the frequency of the rotational field.

It is advisable that the supply wires for the coils 3 and 4, instead of being at right angles to the axis of the wave-guide, should be arranged as much as possible parallel to and at a short distance from the said axis, as shown in Fig. 3.

What I claim is:

1. An adjustable phase-shifting device for alternating voltages comprising means for producing a magnetic rotational field, an output loop disposed without said means and rotatable about the axis of the rotational field, and a cylindrical wave-guide coupling the loop and the rotational field and having an axis coinciding with that of the rotational field, the diameter of said wave-guide being less than 0.578 times the wavelength corresponding to the frequency of the rotational field.

2. A device as claimed in claim 1 wherein the diameter of the wave-guide is less than 0.1 times the wavelength corresponding to the frequency of the rotational field.

3. An adjustable phase-shifter for high-frequency voltages comprising apparatus to produce a magnetic rotational field and including first and second crossed coils and means to apply said high-frequency voltage to said coils in phase quadrature, an output loop disposed without said crossed coils, and a cut-off wave-guide electromagnetically coupling said loop to said cross coils.

4. A phase-shifter, as set forth in claim 3, wherein said wave guide has a cylindrical cross-section and an axis which coincides with that of the rotational field produced by said crossed coils.

5. A phase-shifter, as set forth in claim 4, wherein the diameter of the wave-guide is smaller than 0.578 times the wavelength of the high-frequency voltage.

6. A phase-shifter, as set forth in claim 5, wherein said means to supply said voltage to said first and second coils includes respective leads which are disposed in parallel relation to said axis.

References Cited in the file of this patent
UNITED STATES PATENTS

| | | |
|---|---|---|
| 1,667,497 | Shapiro | Apr. 24, 1928 |
| 2,042,302 | Frantz et al. | May 26, 1936 |
| 2,256,538 | Alford | Sept. 23, 1941 |
| 2,516,060 | Levenson | July 18, 1950 |
| 2,525,554 | Latimer | Oct. 10, 1950 |